United States Patent
Chang

(10) Patent No.: US 6,460,005 B1
(45) Date of Patent: Oct. 1, 2002

(54) APPARATUS AND METHOD FOR MONITORING ENVIRONMENTAL CONDITIONS IN A COMPUTING DEVICE

(75) Inventor: John Kwangil Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 09/637,329

(22) Filed: Aug. 10, 2000

(51) Int. Cl.[7] .......................... G01K 1/00; G06F 15/00
(52) U.S. Cl. ...................... 702/132; 702/130; 702/185; 702/188
(58) Field of Search .................. 702/130, 132, 702/185, 188, 122, 123; 714/48, 46, 25; 340/506, 517, 520; 700/300, 330; 374/185–186

(56) References Cited

U.S. PATENT DOCUMENTS

| | | | | |
|---|---|---|---|---|
| 4,635,195 A | * | 1/1987 | Jeppesen, III et al. | 713/300 |
| 5,696,486 A | * | 12/1997 | Poliquin et al. | 340/506 |
| 5,878,377 A | * | 3/1999 | Hamilton, II et al. | 702/132 |
| 6,308,289 B1 | * | 10/2001 | Ahrens et al. | 714/48 |

\* cited by examiner

*Primary Examiner*—Bryan Bui
(74) *Attorney, Agent, or Firm*—Duke W. Yee; Mark E. McBurney; Stephen J. Walder, Jr.

(57) ABSTRACT

An apparatus and method for monitoring environmental conditions in a computing device is provided. After collecting the initial value of each environmental sensor, a processor calculates the difference between the current value and the next warning/critical level value. The processor instructs an environmental sensor controller to report new sensor measurements only when the sensed value changes by at least a half of the difference between the current value and the next warning/critical level value. Upon receipt of a new sensor value from the environmental sensor controller, the processor adjusts the reporting threshold by re-calculating the difference between the current sensed value and the next warning/critical level value. This process of reporting threshold adjustment continues until the sensor value is within a danger zone. Once the sensor value is within the danger zone, the processor will set the reporting threshold to a minimum allowed for the particular environmental sensor type.

28 Claims, 3 Drawing Sheets

APPARATUS AND METHOD FOR MONITORING ENVIRONMENTAL CONDITIONS IN A COMPUTING DEVICE

BACKGROUND OF THE INVENTION

1. Technical Field

The present invention is directed to an apparatus and method for monitoring environmental conditions in a computing device.

2. Description of Related Art

As computing devices become more complex and run at greater speeds, environmental sensors are increasingly being used to monitor the environmental conditions of the computer components so that catastrophic failure conditions can be avoided. For example, temperature sensors are increasingly being used in association with processors and motherboards in order to determine when temperature levels of the processors exceed a threshold. Once the threshold is exceeded, various cooling devices may be employed to reduce the temperature back down to a safe level.

Typically, these environmental sensors report measured values to a controller when the measured value meets a predetermined fixed reporting threshold. For example, a temperature sensor may report a measured temperature value to the controller only when the temperature has increased by five degrees Celsius or more. Similarly, an revolutions per minute (RPM) sensor on a system fan may report sensed values when the RPMs of the system fan change by 100 RPM or more.

However, with the known environmental sensor systems, a constant eye must be kept on the environmental sensors at all times in order to determine if the environmental conditions exceed a reporting threshold. That is, for every processing cycle, the processor must check of the environmental sensors to determine if any of the sensed values exceed reporting thresholds. If so, the sensed value is reported to the controller which performs appropriate corrective action if the sensed value exceeds a predetermined threshold.

Monitoring the environmental sensors at all times is expensive in terms of processing time in that processing cycles are lost to making determinations of whether or not environmental conditions have changed by a predetermined fixed reporting threshold. Thus, it would be beneficial to have an apparatus and method for monitoring environmental conditions of a computing device in which constant monitoring of the sensed conditions by the processor is not required.

SUMMARY OF THE INVENTION

The present invention provides an apparatus and method for monitoring environmental conditions in a computing device. The apparatus and method of the present invention provide for exponentially increasing or decreasing the awareness of the processor to the state of the environmental sensors in the computing device.

In the present invention, after collecting the initial value of each environmental sensor, the processor calculates the difference between the current value and the next warning/critical level value. The processor instructs an environmental sensor controller to report new sensor measurements only when the sensed value changes by at least a half of the difference between the current value and the next warning/critical level value. Upon receipt of a new sensor value from the environmental sensor controller, the processor will adjust the reporting threshold by re-calculating the difference between the current sensed value and the next warning/critical level value.

This process of reporting threshold adjustment will continue until the sensor value is within a danger zone. Once the sensor value is within the danger zone, the processor will set the reporting threshold to a minimum allowed for the particular environmental sensor type (one degree Celsius for a temperature sensor, for example). In this way, the processor is provided with the highest level of awareness only when the sensed value is within the danger zone. In so doing, processing cycles that would have been lost to maintaining high alertness at all times, as in the known systems, are reclaimed and more processing power is thereby harnessed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
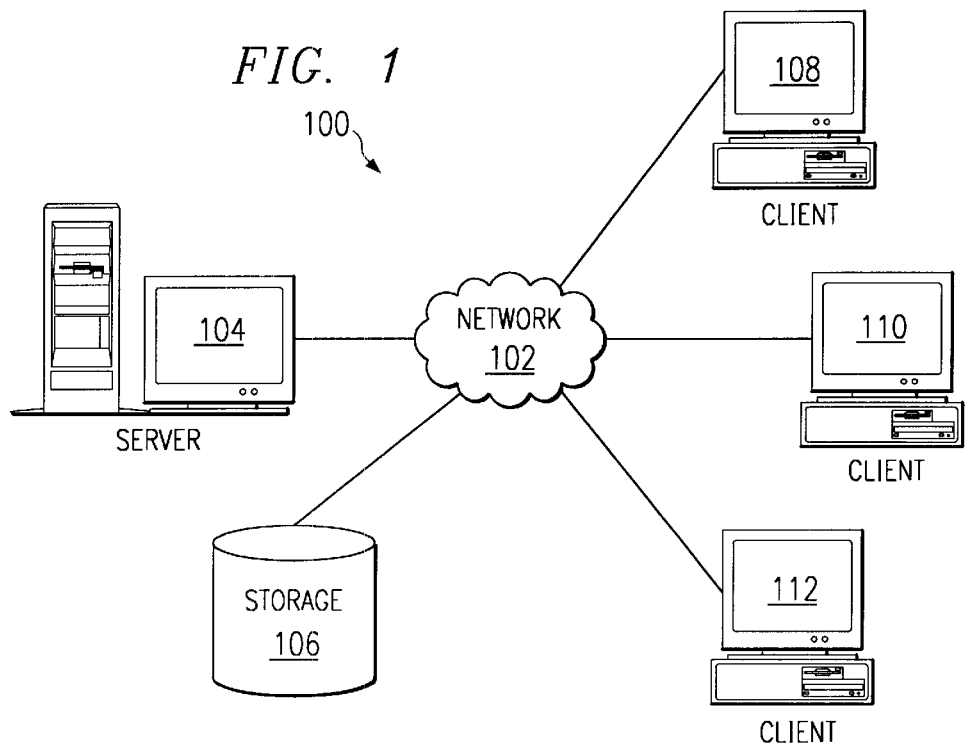
FIG. 1 is a diagram illustrating a distributed data processing system according to the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives an operating system or application program from another computer coupled to the network. In the depicted example, server 104 provides data, such as operating system images and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
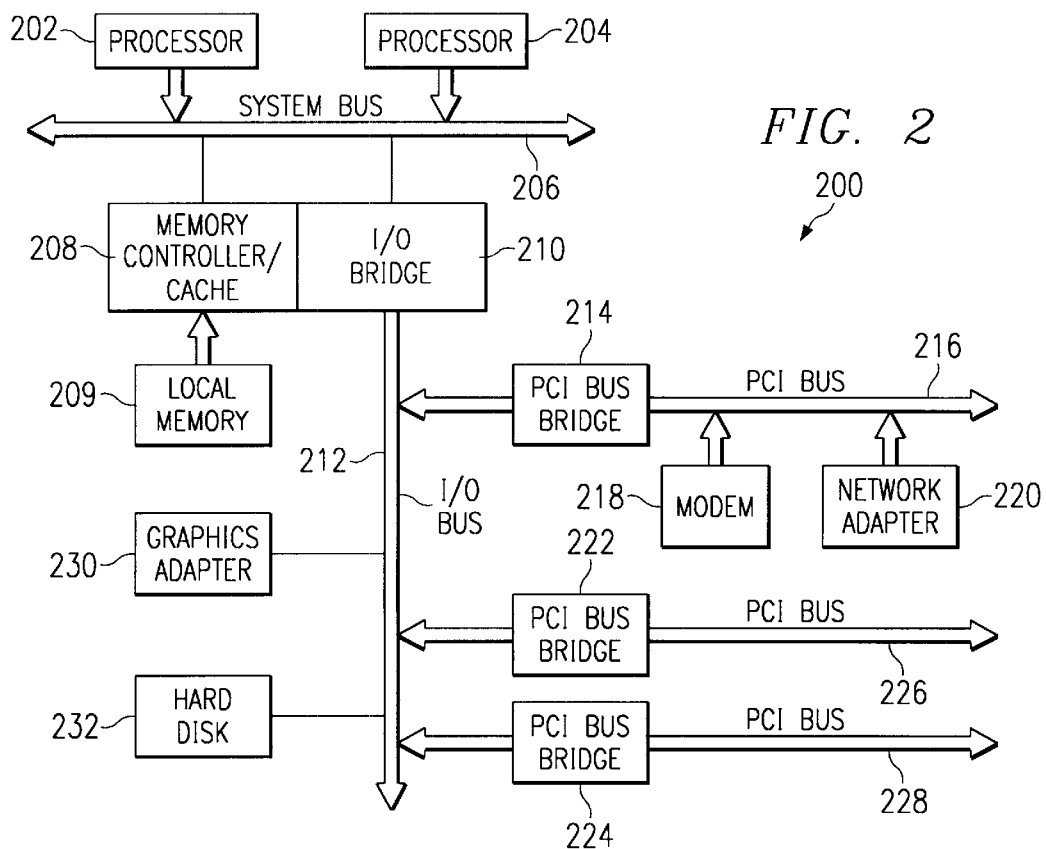
FIG. 2 is an exemplary block diagram of a server according to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

Figure 3:
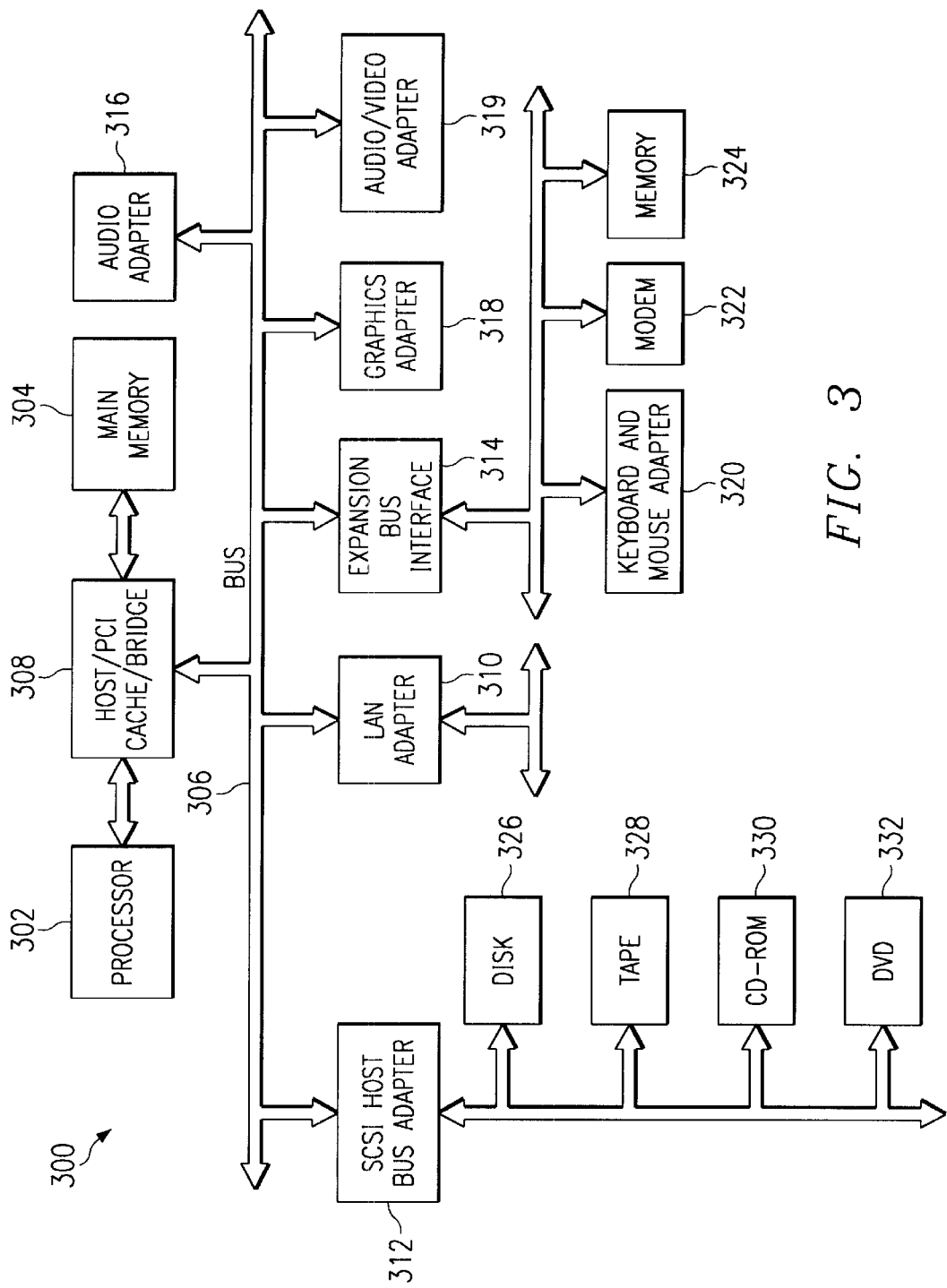
FIG. 3 is an exemplary block diagram of a client according to the present invention.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used.

Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324.

In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

The present invention may be implemented in a stand alone data processing system or in a distributed data processing system. For example, the present invention may be implemented using a single computing device, such as client device 300. Alternatively, the present invention may be implemented in a distributed data processing system, such as distributed data processing system 100 in FIG. 1.

The following description of the present invention does not assume either a stand alone or distributed data processing system embodiment. Rather, the following description is applicable to either a stand alone or distributed data processing system, as will be appreciated by those of ordinary skill in the art.

The present invention provides a mechanism by which environmental conditions in a computing system may be monitored while reducing the amount of processing power necessary to perform the monitoring of these conditions. The present invention may be implemented in any computing device in which environmental sensors are utilized to monitor the environmental conditions of the computing device. Such computing devices may include servers, client devices, stand-alone computing devices, portable devices, and the like. Such computing devices may be incorporated in other devices, such as communication devices (cellular telephones, pagers, wireless personal digital assistants, WebTV™ devices, and the like), control systems, and the like.

Figure 4:
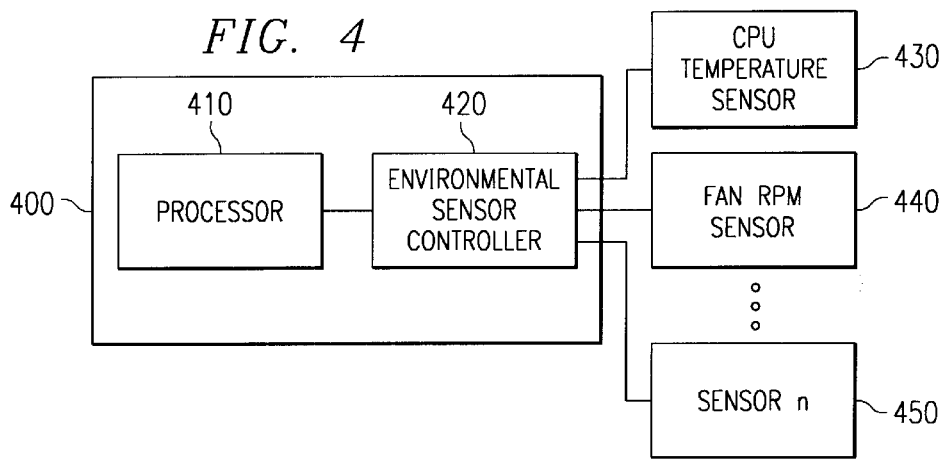
FIG. 4 is an exemplary block diagram of an environmental sensor control system in accordance with the present invention.

FIG. 4 is an exemplary block diagram of the primary components of the environmental control system 400 according to the present invention. As shown in FIG. 4, the environmental control system 400 includes a processor 410 and an environmental sensor controller 420. The environmental sensor controller 420 is coupled to various sensors 430–450, such as a CPU temperature sensor 430, a fan RPM sensor 440, and the like.

The processor 410 may be any type of processor provided in a computing device. The processor 410 may be, for example, the central processing unit (CPU) of the computing device, a secondary processor, or a dedicated processor dedicated to controlling the functions of environmental control devices, such as processor fans and the like. In one particular embodiment, the processor 410 may be a service processor (SP).

The processor 410 is coupled to the environmental sensor controller 420 such that data may be transmitted between the processor 410 and the environmental sensor controller 420. Such coupling may include a system bus or the like.

The environmental sensor controller 420 may be any type of controller that sends and receives information to and from the various sensors 430–450, processes the information, and provides the processor 410 with reports of the conditions monitored by the sensors 430–450. In one particular embodiment, the environmental sensor controller 420 may be a System Power Control Network (SPCN) which may monitor thermal, RPM, and other sensors in the computing device.

The environmental sensor controller 420 is coupled to one or more environmental sensors 430–450 via appropriate connections such that data may be transmitted to and from the sensors 430–450. The sensors 430–450 may be any type of sensor used to monitor environmental conditions of the computing device. For example, the sensors 430–450 may include temperature sensors, RPM sensors, heat flow sensors, and the like.

At initialization, the processor 410 obtains initial measurement values from each of the sensors 430–450 via the environmental sensor controller 420. The processor 410 then calculates a difference between the initial measurement values and a next warning/critical level. The warning/critical levels may be determined from information stored in a system memory, ROM, or the like (not shown).

Based on the difference between the initial measurement values and the next warning/critical level, the processor 410 sends a message to the environmental sensor controller 420 instructing the environmental sensor controller 420 not to provide any environmental reports until the measured value of the sensor(s) meet or exceed a reporting threshold calculated as a function of the calculated difference. This function may be any type of function appropriate for the particular application in which the present invention is implemented. In a preferred embodiment, this function is one half of the difference calculated. These differences and/or report thresholds may be stored by the environmental sensor controller 420 in a memory (not shown) in association with an identifier of the sensor 430–450 to which the report threshold corresponds.

When a measured value from a sensor 430–450 is reported to the environmental sensor controller 420 which exceeds the report threshold for the sensor 430–450, the environmental sensor controller 420 sends a report to the processor 410. Based on the reported sensor measurement value, the processor 410 recalculates the difference between the currently reported measurement value from the sensor and the warning/critical level.

The processor 410 then determines if the difference is within a "danger zone" of the warning/critical level. The "danger zone" may be set based on the particular computing system in which the present invention is implemented and the environmental conditions being monitored. The "danger zone" may be defined and stored in memory associated with the processor 410 such that the processor 410 may retrieve the "danger zone" information from the memory in order to make the comparison to the calculated difference. Thus, for example, if the danger zone is defined as within 5 degrees Celsius of the warning/critical level, and the sensor measurement reported by the environmental sensor controller 420 is within 5 degrees Celsius of the warning/critical level, the processor 410 will have a positive result from the comparison.

If the sensor measurement value reported by the environmental sensor controller 420 indicates that it is within the "danger zone," the processor 410 sets the reporting threshold to a minimum allowed for that particular sensor type. Thus, for example, if the sensor is a temperature sensor, the minimum allowed reporting threshold may be 1 degree Celsius. Thus, every time the temperature changes by 1 degree Celsius, the environmental sensor controller 420 will send a report to the processor 410.

If the sensor measurement value reported by the environmental sensor controller 420 indicates that the current environmental conditions are not within the "danger zone," the reporting threshold is set to half of the new difference calculated between the measurement value reported and the next warning/critical level. This process may continue until the sensor measurement value reported by the environmental sensor controller 420 is within the "danger zone."

Once in the "danger zone" the processor 410 may send appropriate control signals to environmental control systems to take corrective action to prevent a critical condition from occurring within the computing device. Thus, for example, once the temperature of a processor within the computing device is within the "danger zone," the processor 410 may issue instructions to a system fan to start, and thereby attempt to reduce the temperature of the processor. Similarly, if the temperature were to keep increasing, the processor 410 may take additional corrective action, and may even cause the processor to shut down rather than risk permanent damage to the processor.

Thus, with the present invention, rather than reporting at fixed intervals, as with the known systems, the present invention allows for a dynamically determined, and an exponentially stepped reporting threshold. In this way, computing power is increased by saving computing cycles during times in which environmental conditions indicate that there is no real threat of a warning/critical condition occurring.

As an example of the manner in which the present invention operates, assume that a warning temperature is set to 60 degrees Celsius and the "danger zone" is defined as being within three degrees of a warning level. If the initial thermal measurement is 20 degrees Celsius, the processor 410 will instruct the environmental sensor controller 420 to report a new sensor measurement value only if the temperature changes by 20 degrees Celsius or more ((60−20)/2=20). Thus, the next reported temperature would be either 40 degrees Celsius (or more) or, in an unlikely scenario, 0 degrees Celsius (or lower). When the temperature reaches 40 degrees Celsius, the environmental sensor controller 420 will report the sensor measurement value to the processor 410, and in turn, the processor 410 will instruct the environmental sensor controller 420 to report the next measurement only if the temperature changes by 10 degrees Celsius or more ((60−40)/2=10).

Assuming a steady rise in temperature, the next reported temperatures will be 50 degrees Celsius, 55 degrees Celsius, and 57 degrees Celsius ((60−55)/2=2 in integer math). Since 57 degrees Celsius is within the "danger zone" of 3 degrees Celsius, the processor 410 will instruct the environmental sensor controller 420 to report any change in temperature of 1 degree Celsius or greater. When the warning level temperature is finally reached, a warning will be issued and an error log will be made. A new "half-step" march toward a critical level temperature may then commence. In this way, the processor 410 is freed from the chore of closely monitoring the output from the various sensors 430–450 until a situation escalates to the level that warrants attention.

Figure 5:
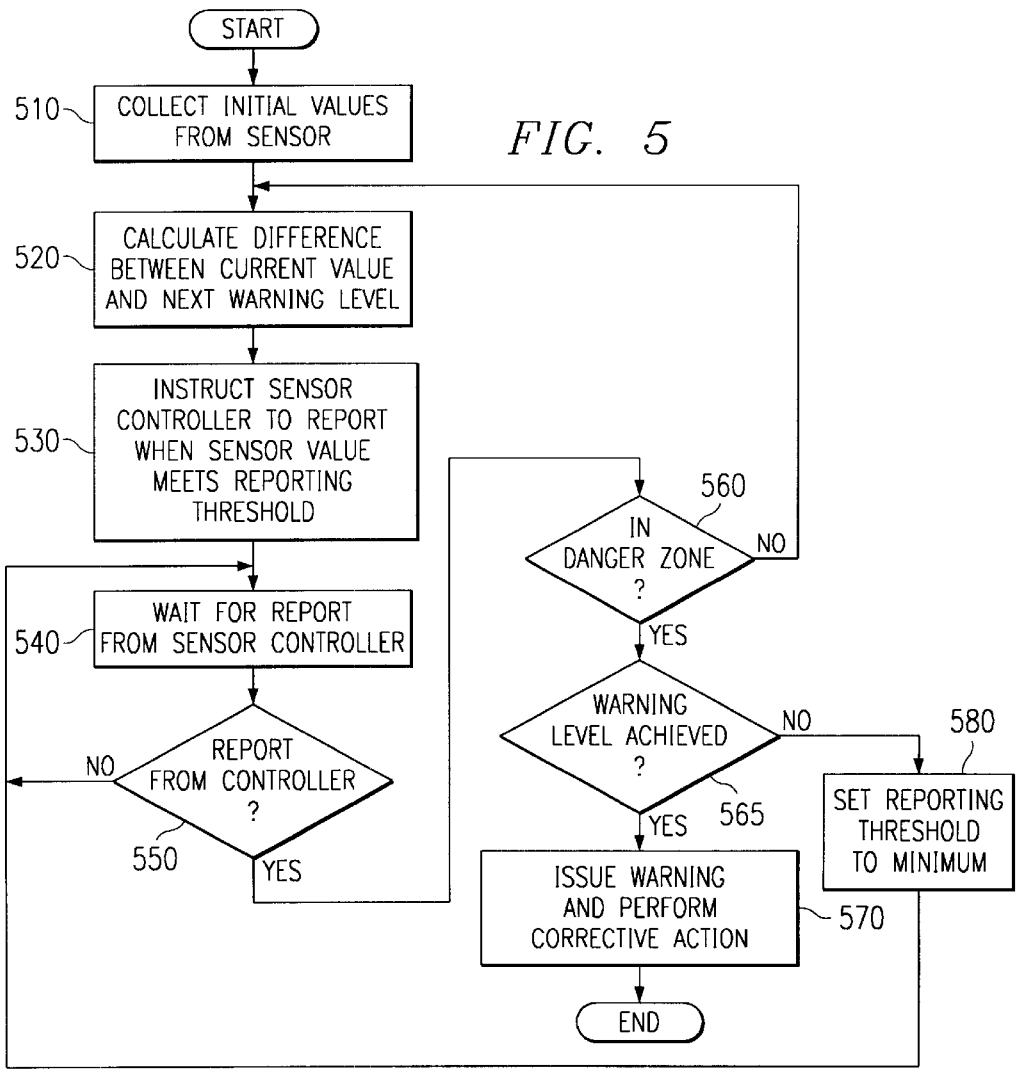
FIG. 5 is a flowchart outlining an exemplary operation of the environmental sensor control system in accordance with the present invention.

FIG. 5 is a flowchart outlining an exemplary operation of the present invention. The flowchart is directed to the operation of the present invention with regard to a single environmental sensor. However, as described above, and shown in FIG. 4, the present invention is applicable to any number of environmental sensors. Furthermore, some of the steps in FIG. 5 may be performed in a different order than that shown in FIG. 5 without departing from the spirit and scope of the present invention. Thus, FIG. 5 is not intended to be limiting in any way but is provided as an example of one possible embodiment of the present invention.

As shown in FIG. 5, the operation starts with the collection of initial values from the sensor (step 510). The difference between the current sensor value and the next warning/critical level is calculated (step 520). The environmental sensor controller is then instructed to report sensor values only when the sensor value meets the reporting criteria which, in a preferred embodiment is half the difference calculated in step 520 (step 530).

The operation then waits for a report from the environmental sensor controller indicating that the sensor value meets the reporting criteria (step 540). A determination is made as to whether a report is received (step 550). If not, the operation continues to wait for a report (step 540). If a report is received, the operation determines if the reported sensor value indicates that the current environmental conditions are within a danger zone (step 560).

If the current environmental conditions are not within the danger zone, the operation returns to step 520 and repeats steps 520–550. If the current environmental conditions are within the danger zone, a determination is made as to whether warning level is achieved (step 565). If the warning level is not achieved, the reporting threshold is set to a minimum (step 580), and the operation returns to step 540. If the warning level has been achieved, a warning is issued and corrective action is performed (step 570). The operation then ends.

As described above, the corrective action could also be performed prior to achieving the warning level, such as when the environmental conditions go into the danger zone. Further, the operation shown in FIG. 5 may be repeated for a number of different warning levels and critical levels. Thus, after step 570, the operation may repeat, starting with step 510 or 520, with the next warning/critical level being used.

Thus, the present invention provides a mechanism by which environmental conditions in a computing system may be monitored in an exponentially stepped manner. The present invention allows for monitoring of environmental conditions while reducing the amount of processing power necessary to perform the monitoring of these conditions since computing cycles are conserved when environmental conditions are not near warning levels.

While the present invention has been described with reference to the reporting threshold being one half the difference between the current sensor value and a warning level value, the invention is not limited to such. Rather, any increment may be chosen based on the difference between the current sensor value and the warning level value depending on the sensitivity of the computing system in which the present invention is implemented. Thus, rather than one half the difference, a particular embodiment may call for one third, one fourth, of any other fraction of the difference as the mechanism for setting the reporting threshold. Furthermore, a more elaborate function of the difference may be implemented to generate a reporting threshold without departing from the spirit and scope of the present invention.

Furthermore, the present invention has been described with reference to monitoring the environmental conditions of a computing device. While this is a preferred embodiment of the present invention, the invention is not limited to this particular application of the invention. Rather, the present invention may be used with any system in which sensors are used to monitor and report back measurements of environmental conditions. For example, the present invention may be used to monitor temperature, pressure and humidity levels in a computer monitored compartment. Many different applications of the present invention may be made without departing from the spirit and scope of the invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring a condition of a system, comprising:

determining a difference in a current state of the system and a warning threshold;

calculating a reporting threshold as a function of the difference in the current state of the system and the warning threshold; and instructing a reporting system to report the condition of the system only when the condition of the system meets the reporting threshold.

2. The method of claim 1, further comprising:

determining a danger zone for the warning threshold;

determining if the current state of the system is within the danger zone; and setting the reporting threshold to a minimum if the current state of the system is within the danger zone.

3. The method of claim 2, further comprising initiating corrective action to change the condition of the system if the current state of the system is within the danger zone.

4. The method of claim 2, wherein the minimum is a minimum reporting threshold associated with a sensor in the system.

5. The method of claim 1, wherein the reporting threshold is calculated as a fraction of the difference in the current state of the system and the warning threshold.

6. The method of claim 1, wherein the system comprises one or more sensors, and wherein the current state of the system is identified by measurements made by the one or more sensors.

7. The method of claim 6, wherein the one or more sensors include one of a temperature sensor, a pressure sensor, a humidity sensor, and a revolutions-per-minute sensor.

8. The method of claim 1, wherein the determining, calculating, and instructing steps are repeated, each time the condition of the system is reported, until the condition of the system is within a danger zone of the warning threshold.

9. The method of claim 1, further comprising issuing a warning if the current state of the system meets the warning threshold.

10. The method of claim 1, wherein the system is a computing system.

11. An apparatus for monitoring a condition of a system, comprising:

a system controller; and a processor coupled to the system controller, wherein the system controller reports a current state of the system to the processor, the processor determines a difference in the current state of the system and a warning threshold, calculates a reporting threshold as a function of the difference in the current state of the system and the warning threshold, and instructs the system controller to report the condition of the system only when the condition of the system meets the reporting threshold.

12. The apparatus of claim 11, wherein the processor further determines a danger zone for the warning threshold, determines if the current state of the system is within the danger zone, and sets the reporting threshold to a minimum if the current state of the system is within the danger zone.

13. The apparatus of claim 12, wherein the processor initiates corrective action to change the condition of the system if the current state of the system is within the danger zone.

14. The apparatus of claim 12, wherein the minimum is a minimum reporting threshold associated with a sensor in the system.

15. The apparatus of claim 11, wherein the reporting threshold is calculated as a fraction of the difference in the current state of the system and the warning threshold.

16. The apparatus of claim 11, wherein the system comprises one or more sensors, and wherein the current state of the system is identified by measurements made by the one or more sensors.

17. The apparatus of claim 16, wherein the one or more sensors include one of a temperature sensor, a pressure sensor, a humidity sensor, and a revolutions-per-minute sensor.

18. The apparatus of claim 11, wherein processor repeatedly performs the determining of a difference in the current state of the system and a warning threshold, the calculating of the reporting threshold as a function of the difference in the current state of the system and the warning threshold, and the instructing of the system controller to report the condition of the system only when the condition of the system meets the reporting threshold, until the condition of the system is within a danger zone of the warning threshold.

19. The apparatus of claim 11, wherein the processor issues a warning if the current state of the system meets the warning threshold.

20. The apparatus of claim 11, wherein the system is a computing system.

21. A computer program product in a computer readable medium for monitoring a condition of a system, comprising:

first instructions for determining a difference in a current state of the system and a warning threshold;

second instructions for calculating a reporting threshold as a function of the difference in the current state of the system and the warning threshold; and third instructions for instructing a reporting system to report the condition of the system only when the condition of the system meets the reporting threshold.

22. The computer program product of claim 21, further comprising:

fourth instructions for determining a danger zone for the warning threshold;

fifth instructions for determining if the current state of the system is within the danger zone; and sixth instructions for setting the reporting threshold to a minimum if the current state of the system is within the danger zone.

23. The computer program product of claim 22, further comprising seventh instructions for initiating corrective action to change the condition of the system if the current state of the system is within the danger zone.

24. The computer program product of claim 22, wherein the minimum is a minimum reporting threshold associated with a sensor in the system.

25. The computer program product of claim 21, wherein the reporting threshold is calculated as a fraction of the difference in the current state of the system and the warning threshold.

26. The computer program product of claim 21, wherein the system comprises one or more sensors, and wherein the current state of the system is identified by measurements made by the one or more sensors.

27. The computer program product of claim 21, wherein the first, second and third instructions are repeated, each time the condition of the system is reported, until the condition of the system is within a danger zone of the warning threshold.

28. The computer program product of claim 21, further comprising fourth instructions for issuing a warning if the current state of the system meets the warning threshold.

* * * * *